United States Patent
Han et al.

(10) Patent No.: US 8,092,775 B2
(45) Date of Patent: *Jan. 10, 2012

(54) CONTINUOUS METHOD FOR PURIFYING CARBON NANOTUBE

(75) Inventors: Joo Hee Han, Daejeon (KR); Jin Seo Lee, Daejeon (KR); Seung-Hoe Do, Daejeon (KR); Seong Cheol Hong, Daejeon (KR)

(73) Assignee: Hanwha Chemical Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/569,050

(22) Filed: Sep. 29, 2009

(65) Prior Publication Data

US 2010/0080748 A1 Apr. 1, 2010

(30) Foreign Application Priority Data

Sep. 30, 2008 (KR) .................. 10-2008-0095856

(51) Int. Cl.
 *C01B 31/04* (2006.01)
 *D01F 9/127* (2006.01)
(52) U.S. Cl. .............. 423/447.8; 423/447.1; 423/447.3; 977/843; 977/847
(58) Field of Classification Search .... 423/447.1–447.3, 423/445 B; 977/742–754, 842–848; 428/367
See application file for complete search history.

(56) References Cited

U.S. PATENT DOCUMENTS

| 5,641,466 A | 6/1997 | Ebbesen et al. |
| 2006/0097228 A1 | 5/2006 | Lee et al. |
| 2006/0239891 A1* | 10/2006 | Niu et al. .................. 423/445 R |

FOREIGN PATENT DOCUMENTS

| JP | 8-12310 | 1/1996 |
| KR | 10-2001-0049298 | 6/2001 |

OTHER PUBLICATIONS

Rinzler, et al., Large-scale purification of single-wall carbon nanotubes: process, product, and characterization, Appl. Phys. A 1998; 67: 29-37.*

Ki Chul Park et al., "Progressive and invasive . . . under superficial conditions", Journal of Materials Chemistry, vol. 15, (2005), pp. 407-411.

* cited by examiner

*Primary Examiner* — Daniel C. McCracken
(74) *Attorney, Agent, or Firm* — Christopher W. Brody

(57) ABSTRACT

Provided is a continuous method and apparatus for purifying carbon nanotubes. Carbon nanotube is fed together with solvent into a preheater via a heat exchanger to produce a carbon nanotube mixture. The carbon nanotube mixture is preheated at 100 to 370° C. Then, the carbon nanotube mixture is purified in a purifying reactor under a subcritical water condition of 50 to 400 atm. The resulting purified product is cooled down to 0 to 100° C. and depressurized into 1 to 10 atm by feeding the purified product into a cooling down and depressurizing part via the heat exchanger. Finally, the cooled and depressurized product is recovered.

9 Claims, 8 Drawing Sheets

CONTINUOUS METHOD FOR PURIFYING CARBON NANOTUBE

CROSS-REFERENCE(S) TO RELATED APPLICATIONS

The present invention claims priority of Korean Patent Application No. 10-2008-0095856, filed on Sep. 30, 2008, which is incorporated herein by reference.

BACKGROUND OF THE INVENTION

1. Field of the Invention

The present invention relates to a continuous method of purifying carbon nanotubes, and more particularly, to a continuous method of purifying carbon nanotubes under a sub-critical water or supercritical water condition.

2. Description of Related Art

A structure of the carbon nanotube (hereinafter, referred to CNT) was discovered firstly in 1991; and manufactures, physical properties and applications thereof have been accomplished actively. Further, it is confirmed that the CNT is prepared if transition metals such as Fe, Ni, and Co are added upon electric-discharging. The full-scale research is not initiated until considerable samples are produced by means of a laser vaporization method in 1996. Such CNT is in a shape of hollow tube having a graphite surface rolled up in a nano-sized diameter. At this time, the electric property of the CNT is classified into conductor or semi-conductor in accordance with degree and structure with which the graphite surface is rolled up. Further, the CNT can be classified into a single-walled carbon nanotube SWCNT, a double-walled carbon nanotube DWCNT, thin multi-walled carbon nanotube, a multi-walled carbon nanotube MWCNT, and roped carbon nanotube in accordance with the number of the graphite walls.

In particular, the CNT is superior in mechanical intensity and elasticity, and has chemical stability, environmental friendliness, as well as electrical conductivity and semi-conductivity. Further, the CNT has a diameter of 1 nm to several tens nm and a length of several μm to several tens μm so that it is greater than any exiting materials of which aspect ratio amounts to about 1,000. Further, since its specific-surface area is very large, it is under the spotlight in various fields such as future-generation information electronic material, high-efficiency energy material, high-capacity complex material, and environmental friendliness material.

However, it is difficult to utilize electric, mechanical and physical properties of the CNT due to impurities such as carbon substance, amorphous graphite, and alpha carbon besides the CNT which are prepared during the manufacturing process of the CNT. Therefore, it is necessary for a continuous method of purifying a large amount of CNT in order to enlarge the practical range in various uses while supporting the properties of the CNT. The technique of purifying the CNT is exemplified as a method of purifying the CNT using an acidic gas pyrolysis in Korean patent No. 2001-0049298, a method of purifying through the pyrolysis using an oxidizer in U.S. Pat. No. 5,641,466 and a method of purifying at a higher temperature using the oxidizer in Japanese Patent No. 1996-12310.

However, in cases of the above techniques, the time needed for heat treatment is long and steps up to an acid-treatment process are complicated, which results in consuming too much time.

SUMMARY OF THE INVENTION

An embodiment of the present invention is directed to providing a continuous method of purifying carbon nanotubes under a sub-critical water or supercritical water condition using a continuous apparatus without separate purifying processes.

To achieve the object of the present invention, the present invention provides a continuous method of purifying carbon nanotubes comprising a first purifying step for injecting a carbon nanotube liquid mixture containing an oxidizer into a purifying reactor under a sub-critical water or supercritical water condition at a pressure of 50 to 400 atm and a temperature of 100 to 600° C. to obtain a purified product.

Further, the present invention provides a continuous apparatus of purifying carbon nanotubes comprising a mixing unit for forming a carbon nanotube solution by allowing the carbon nanotubes to be mixed with a solvent containing water using a circulation pump; a pre-heater for heating a carbon nanotube liquid mixture formed by allowing the pre-heated carbon nanotube solution to be in contact with an oxidizer and mixed with the oxidizer while the carbon nanotube solution is injected at a pressure of 50 to 400 atm; a first purifying-reactor in which the liquid mixture is injected under a sub-critical water or supercritical water condition at a pressure of 50 to 400 atm and a temperature of 100 to 600° C.; a de-pressurizing unit for de-pressurizing the purified product up to 1 to 10 atm via a cooling apparatus that cools the purified product to a temperature of 0 to 100° C.; and a product storage vessel for recovering the product de-pressurized by the de-pressurizing unit.

Further, the present invention provides the carbon nanotubes purified according to the continuous method.

DETAILED DESCRIPTION OF MAIN ELEMENTS

Figure 1:
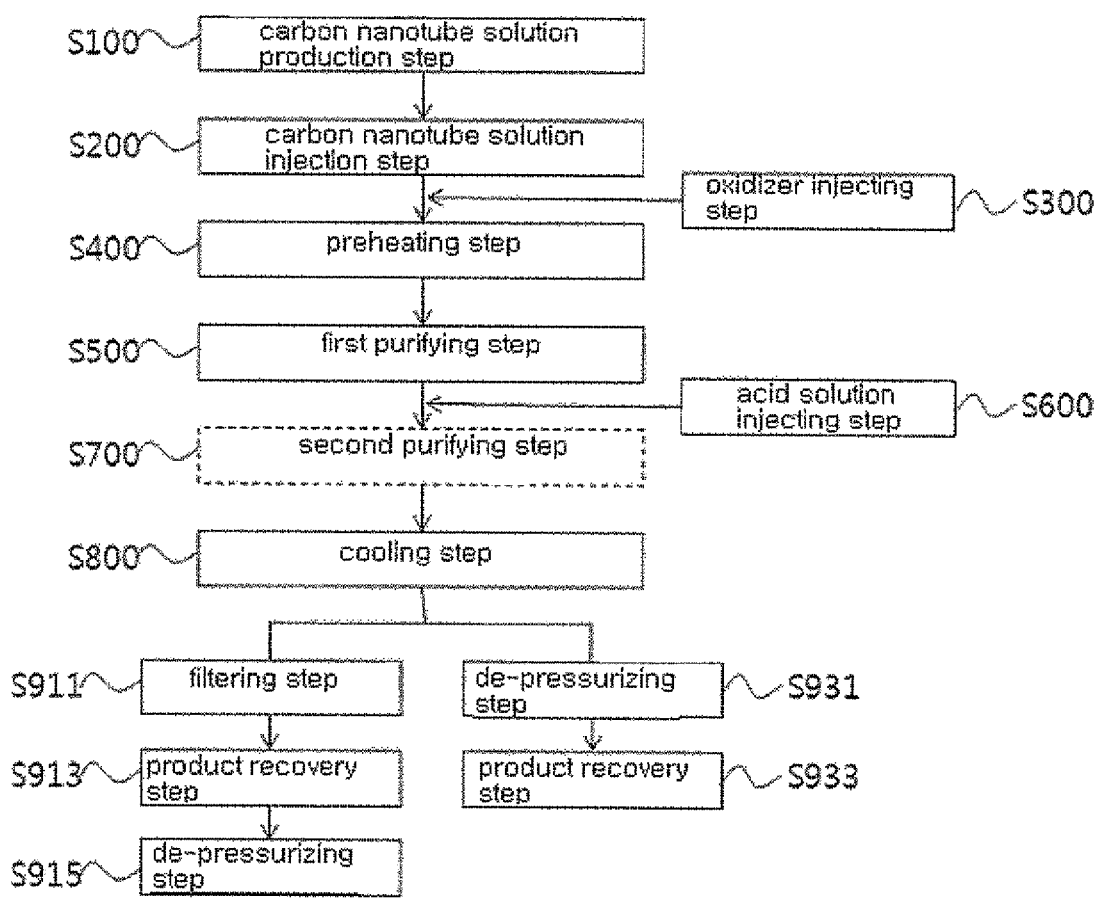
FIG. 1 is a flow diagram of continuous method of purifying carbon nanotubes according to one preferable embodiment of the present invention.

10: circulation pump
20: CT solution high-pressure infusion pump

30: oxidizer high-pressure infusion pump
40: heat exchanger
50: acid solution high-pressure infusion pump
60: cooling apparatus
70: filtering pressure control apparatus
80: pressure control apparatus
100: mixing unit 200: pre-heater
310: first purifying-reactor
330: second purifying-reactor
410: first filtering unit
430: second filtering unit
500: filtrate storage vessel
600: de-pressurizing unit
700: product storage vessel

DESCRIPTION OF SPECIFIC EMBODIMENTS

The advantages, features and aspects of the invention will become apparent from the following description of the embodiments with reference to the accompanying drawings, which is set forth hereinafter. In the drawings, it is noted that like components or parts represent possibly like reference numerals. Upon explaining the present invention, the specific explanations on the related known function or structure are omitted in order to make the subject matter of the present invention obvious.

The terms of "about", "substantially" and so on used in the specification are used as a numerical value or a meaning closed to the numerical value when a tolerance of production and material inherent in the meaning mentioned is presented, and used to prevent conscienceless invaders from using the teachings in which correct or absolute numeral values are disclosed to help the understanding of the present invention FIG. 1 is a flow diagram of continuous purification method of carbon nanotubes according to one preferable embodiment of the present invention. Referring to FIG. 1, the purification of carbon nanotubes according to the present invention may be processed in a carbon nanotube solution production step S100, a carbon nanotube solution injecting step S200, an oxidizer injecting step S300, a pre-heating step S400, a first purification step S500, and a cooling step S800; and further an acid solution injecting step S600 and a second purification step S700 may be processed after the first purification step S500, and a filtering step S911, a product recovering step S913, and de-pressurizing step S915 or the de-pressurizing step S931 and a product recovering step S933 are processed after the cooling step S800.

Figure 2:
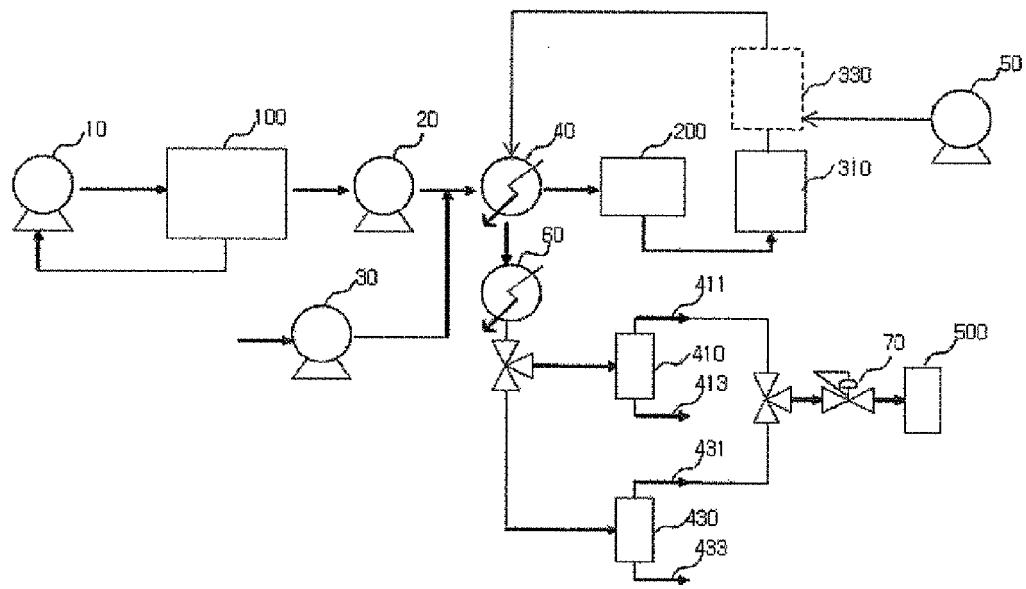
FIG. 2 is a flow diagram of continuous, apparatus of purifying carbon nanotubes including a filtering apparatus according to one preferable embodiment of the present invention.

FIG. 2 is a process view showing a continuous apparatus of purifying carbon nanotubes in which a filtering apparatus is included according to one preferable embodiment of the present invention. Referring to FIG. 2, the continuous apparatus of purifying carbon nanotubes according to the present invention includes a mixing unit 100, pre-heater 200, a first purifying-reactor 310, a first filtering unit 410, a second filtering unit 430 and a filtrate storage vessel 500, and a second purifying-reactor 330 may be further included next to the first purifying-reactor 310.

Figure 3:
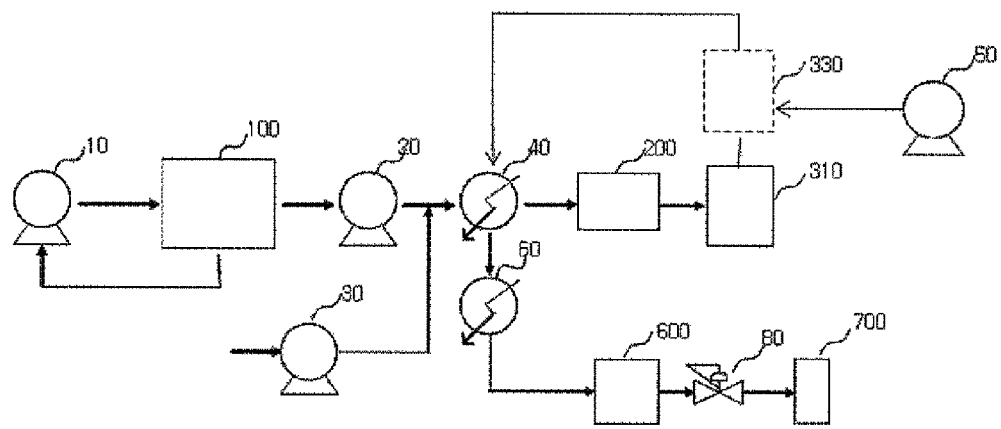
FIG. 3 is a flow diagram of continuous apparatus of purifying carbon nanotubes including a filtering apparatus according to one preferable embodiment of the present invention.

FIG. 3 is a process view showing a continuous apparatus of purifying carbon nanotubes according to one preferable embodiment of the present invention. Referring to FIG. 3, the continuous apparatus of purifying carbon nanotubes in which a de-pressurization tub is included according to other example of the present invention may further include a mixing unit 100, a pre-heater 200, a first purifying-reactor 310, a de-pressurization tub 600 and a product storage vessel 700, and a second purifying-reactor 330 may further be included next to the first purifying-reactor 310.

The present invention may include a first purification step in which the purified product is formed in the purifying-reactor by injecting the carbon nanotube liquid mixture including the oxidizer under a sub-critical water or supercritical water condition at a pressure of 50 to 400 atm and a temperature of 100 to 600° C. and a second purification step in which inorganic matters is to be removed by causing the first purified product to be reacted with the acid solution.

The carbon nanotube liquid mixture containing the oxidizer is formed by which the oxidizer is injected to make it contact with the carbon nanotube solution while the carbon nanotube solution is injected into the pre-heater 200 located at a front end of the first purifying-reactor 310. At this time, the carbon nanotube liquid mixture is injected into the pre-heater 200 and then is undergone through the pre-heating step S400 at a temperature of 200 to 370° C.

Specifically, the continuous purification method of the carbon nanotube is characterized in that the carbon nanotube and a solvent is circulated by a circulation pump 10 in the mixing unit 100 to produce the carbon nanotube solution in a carbon nanotube solution production step S100, the carbon nanotube solution is injected into the pre-heater 200 located at a front end of the first purifying-reactor at a pressure of 50 to 400 atm by the CNT solution high-pressure infusion pump 20 in a carbon nanotube solution injection step S200 while the oxidizer is injected by the oxidizer high-pressure infusion pump 30 at a pressure of 50 to 400 atm in an oxidizer injecting step S300, and the liquid mixture of the carbon nanotube solution and the oxidizer formed by contacting the oxidizer to the carbon nanotube solution is injected into the pre-heater 200 and undergone through the preheating step S400 at a temperature of 200 to 370° C.

In the carbon nanotube-solution production step S100, the carbon nanotube solution containing the carbon nanotube and the solvent is injected into the mixing unit 100 and produced by the circulation pump 10 before the liquid mixture of the oxidizer and the carbon nanotube is produced. The solvent contained in the CNT solution necessarily contains water and can be selected from a group consisted of aliphatic alcohol of C1-C20, carbon dioxide and a combination of them.

The CNT is preferably selected from a group consisted of a single-walled, a double walled, a thin multi-walled, a multi-walled, roped and a combination of them.

Further, the CNT is contained with at least 0.0001 parts by weight of the solvent and preferably 0.001 to 19 parts by weight. If the CNT is less than 0.0001 parts by weight, the recovery amount of the CNT is too small.

As the CNT solution is injected into the pre-heater 200 at a pressure of 50 to 400 atm through the CNT solution high-pressure infusion pump 20, the CNT solution is contacted to the oxidizer injected using the oxidizer high-pressure infusion pump 30 at a pressure of 50 to 400 atm so that the CNT solution is mixed with the oxidizer at a front end of the heat exchanger 40, and then the liquid mixture of them is injected into the pre-heater 200 and pre-heated at a temperature of 100 to 370° C.

If the pressure is less than 50 atm when the CNT solution and the oxidizer are injected through the high-pressure infusion pump, it is difficult to allow the CNT solution and the oxidizer to be injected into the pre-heater 200 and the first purifying-reactor. On the other hand, if the pressure is more than 400 atm, the energy loss is caused due to higher pressure.

The carbon nanotube solution further contains a nitro compound of a chemical equation 1.

$$R-(NO_x)_y \qquad \text{[Chemical equation 1]}$$

Where, R is alkyl group of $C_1$-$C_7$ or an aryl group of $C_6$-$C_{20}$, x and y are integers of 1 to 3 independently. The nitro compound is preferably nitro methane, nitro ethane or nitro propane.

The nitro compound is contained at 0.00001 to 3 mol/L, in which it is impossible to purify the carbon nanotube efficiently if the nitro compound is less than 0.00001 mol/L; and it is impossible to make sure desirable yields since the carbon nanotube can be damaged while the inorganic matters and amorphous carbon are removed if it is more than 3 mol/L.

The preheating tub 200 is to pre-heat the liquid mixture in order to make uniform a temperature of the first or the second purifying-reactors 310 and 330 before treating the liquid mixture under the sub-critical water or supercritical water condition that is mentioned later.

Therefore, the pre-heater 200 is provided with the heat exchanger at a front end thereof and is responsible for preheating the liquid mixture of the CNT and the oxidizer. The heat exchanger 40 is responsible for primarily lowering the temperature before ultimately cooling the purified product under the sub-critical water or supercritical water condition to prevent the energy loss from being consumed upon subsequent cooling. If the temperature is less than 100° C., the temperature is further raised at the threshold condition so that the energy loss can not be prevented, and if it is more than 370° C., the energy needed to increase the temperature above preheat efficiency is even increased so that there is no need to provide the heat exchanger.

Meanwhile, the oxidizer can be selected from a group consisted of oxygen, air, ozone, hydrogen peroxide, nitro compound, nitric acid oxidizer, and a combination of them. The oxidizer can be contained at a 0.001 equivalent to 10 equivalent in proportion to carbon equivalent of the CNT within the carbon nanotube liquid mixture.

The impurities such as nanocarbon, amorphous carbon and alphacarbon which were contained in the CNT solution before the CNT is oxidized due to the oxidizer can be oxidized and eliminated. This is because the nano carbon, amorphous carbon, alpha carbon has a high reactivity with the oxidizer in comparison to the CNT so that the reaction rate with the oxidizer is very quick. That is, the impurities are eliminated due to a difference in the reaction rate of particle sizes.

Therefore, the CNT is not uniformly oxidized with the oxidizer to cause impurities not to be eliminated and the purification rate to be low if the oxidizer is injected at less than 0.001 equivalent based on the CNT carbon, while the purification efficiency is not improved as much if it is injected at more than 10 equivalent.

The carbon nanotube liquid mixture preheated via the preheating step S400 is carried to the first continuous purifying-reactor 310, where the first purification step S500 is processed for the carbon nanotube under the sub-critical water or supercritical water condition of 50 to 400 atm. At this time, the temperature under the sub-critical water or supercritical water condition is preferably 100 to 600° C.

The pressure of the sub-critical water condition is preferably 50 to 260 atm and more preferably 60 to 260 atm. Further, the temperature is preferably 100 to 380° C. and more preferably 200 to 350° C. At this time, the treatment time is preferably processed for 1 to 30 minutes, and more preferably for 5 to 15 minutes.

Meanwhile, the pressure in the supercritical water condition is preferably 150 to 400 atm, and more preferably 210 to 300 atm. Further, the temperature is preferably 350 to 600° C., and more preferably 370 to 500° C. At this time, the treatment time is preferably processed for 1 to 30 minutes, and more preferably for 5 to 15 minutes.

Due to such sub-critical water or supercritical water condition, since the oxidizer is quickly reacted with the impurities such as nanocarbon, amorphous carbon and alpha carbon, it is possible to remove the impurities via oxidation in a short time. Therefore, the purification efficiency can be differentiated due to a difference in reactivity of the oxidizer and the impurities The selection under the sub-critical water or supercritical water condition is to control the purification rate, which means a temperature or a pressure condition represented above.

The continuous method of purifying carbon nanotubes according to the present invention can further include the second purification step S700 in which the first purified product is reacted with the acid solution to remove the inorganic matters. Since the second purification step can further purify the inorganic matters as well as impurities within the carbon nanotube to improve the purification effect, it is possible to obtain high quality samples applied to FED, LCD backlight, high-integrated memory device, fuel cell and the like which require the CNT of high purity.

After the first purified product via the first purification step S500 is injected into the second purifying-reactor 330, the acid solution is injected into the second purifying-reactor 330 using the acid solution high-pressure injection pump 50 at a pressure of 50 to 400 atm and a temperature of 100 to 600° C. to remove the inorganic matters such as metal or catalyst in the acid solution injecting step S600. If the pressure at which the acid solution is injected is less than 50 atm, it is difficult for the acid solution to be injected into the second purifying-reactor 330, and if it is greater than 400 atm, the energy loss is caused due to a higher pressure and the purification rate is no longer improved.

Herein, the continuous method of purifying carbon nanotubes according to the present invention allows the acid solution to be injected into an entrance portion of the second purifying-reactor under the sub-critical water or supercritical water condition.

The acid solution is reacted with the metal inorganic matters contained in the catalyst used at the time of the carbon nanotube manufacture to form salt which is then melted into the solution, so that the inorganic matters are removed.

Therefore, the acid solution can contain any one acid selected from a group consisted of nitric acid, hydrochloric acid, phosphoric acid, sulfuric acid and a combination of them, and nitric acid or phosphoric acid is preferable.

The continuous method of purifying carbon nanotubes is characterized in that the acid solution is injected at 0.00001 to 3.0M, and preferably 0.005 to 1.0M. If the acid solution is injected at less than 0.00001M, the impurities such as inorganic matters are not sufficiently removed, and if it is injected at greater than 3.0M, the removal efficiency are not improved as much, which results in waste materials.

The present invention provides a continuous method of purifying carbon nanotubes which includes a cooling step S800 cooling the first or the second purified product at 0 to 100° C.; a filtering step S911 after the cooling step; a recovery step S913 recovering the filtered product; a de-pressurizing step S915 de-pressurizing the product at 1 to 10 atm after recovering it.

In the acid solution injecting step S600, the acid solution is injected into the second purifying-reactor 330 located in a rear portion of the first purifying-reactor 310 by the acid solution high-pressure infusion pump 50 to purify the metal inorganic matters of the first purified product at a temperature of 200 to 300° C. The heat exchanger 40 which is provided at a front end of the pre-heater 200 and used to pre-heat the CT solution is reused for firstly cooling the first or second purified product discharged from the second purifying-reactor 330 to be a temperature of 100 to 200° C., thereby preventing the energy loss.

The first or second purified product is firstly cooled by the heat exchanger 40 and then cooled up to a temperature of 0 to 100° C. via the cooling apparatus 60. The cooling temperature is preferably controlled at a temperature of 20 to 50° C.

The filtering step S911 can be processed via the filtering units 410, 430 which have high-pressure filters with a void of 0.001 to 10 μm connected in parallel to be operated in a switching manner, in order to filter the first or the second purified and cooled product. It is possible to recover the purified CNT of solid state via the filtering step S911.

The filtering units 410, 430 cause the product to be divided into filtrates 411, 431 and purified CNT filtered product 413, 433, and the filtrates 411, 431 are de-pressurized at a normal pressure state via a filtering pressure control apparatus 70 and transferred to the filtrate storage vessel 500. One or more filtering units 410, 430 can be provided in parallel in accordance with necessary capacity.

Specifically, when the product is divided into the CNT filtered product and the filtrates via the filtering units 410, 430 connected in parallel, if the filtering unit 410 is subject to pressure to cause its valve to be closed, the filtering unit 430 is opened to filter the purified and cooled product, and at the same time the CNT filtered product 413 within the filtering unit 410 are recovered and the filtrates 411 is transferred to the filtrate storage vessel 500.

Similarly, if the filtering unit 430 is subject to pressure to cause its valve to be closed, the filtering unit 410 is opened to filter the purified and cooled product, and at the same time the CNT filtered product 433 within the filtering unit 430 are recovered and the filtrates 431 is transferred to the filtrate storage vessel 500. Such operation of the filtering units is processed repeatedly in an alternating manner, which results that the filtering can be accomplished continuously. After the filtering step S911, the product is undergone through the product recovery step S913 that recovers the filtered product of solid state and then the de-pressurizing step S915 that de-pressurizes it up to 1 to 10 atm.

More specifically, the product cooled via the cooling step S800 is transferred to the de-pressuring tub 600 and undergone through the de-pressurizing step S931 up to 1 to 10 atm. The de-pressurizing step is processed such that the product is firstly de-pressurized up to 10 to 100 atm by a capillary de-pressuring apparatus and then finally de-pressurized up to 1 to 10 atm by a pressure control apparatus 80.

More specifically, the product cooled via the cooling step S800 is transferred to the de-pressuring tub 600 and undergone through the de-pressurizing step S931 up to 1 to 10 atm. The de-pressurizing step is processed such that the product is firstly de-pressurized up to 10 to 100 atm by a capillary de-pressuring apparatus and then finally de-pressurized up to 1 to 10 atm by a pressure control apparatus 80.

The continuous method of purifying carbon nanotubes according to the present invention is finally performed by recovering the carbon nanotube purified via the recovering step S933 into the product storage 700.

The continuous apparatus used for purifying the carbon nanotube includes a mixing unit 100 that forms the carbon nanotube solution by allowing the carbon nanotube to be mixed with the solvent containing water by the circulation pump; a pre-heater 200 that heats the carbon nanotube liquid mixture formed by allowing the pre-treated carbon nanotube solution to be mixed with the oxidizer at a temperature of 100 to 370° C. while the carbon nanotube solution is injected at a pressure of 50 to 400 atm; a first purifying-reactor 310 in which the liquid mixture is injected under the sub-critical water or supercritical water condition processed at a pressure of 50 to 400 atm; a de-pressurizing unit 600 that de-pressurizes the purified product up to 1 to 10 atm via the cooling apparatus 60 that cools the purified product to a temperature of 0 to 100° C.; and a storage vessel 700 that recovers the product de-pressurized by the de-pressurizing unit.

Further, the continuous apparatus of purifying carbon nanotubes according to the present invention can further include the second purifying-reactor 330 that causes the first purified product purified via the first purifying-reactore to be reacted with the acid solution to remove the inorganic matters.

Further, the continuous apparatus of purifying carbon nanotubes according to the present invention is provided with the heat exchanger 40 located at a front end of the pre-heater 200, in which the heat exchanger 40 is to exchange heat between the carbon nanotube liquid mixture prior to preheating and the purified product.

The continuous apparatus of purifying carbon nanotubes is characterized in that the de-pressurized apparatus is used with a capillary de-pressurizing apparatus.

The continuous apparatus of purifying carbon nanotubes further includes the filtering units 410, 430 which have high-pressure filters having a void of 0.001 to 10 μm connected in parallel to be operated in a switching manner. If the void of the high-pressure filter is less than 0.00 μm, the purified carbon nanotube blocks the filter so that there is a concern about an energy load, and if it is greater than 10 μm, the filtering efficiency is eliminated so that there are concerns that the powder particles of the carbon nanotube are not equal.

The present invention provides the carbon nanotube purified by the continuous method.

Hereinafter, embodiments of the present invention will be described specifically.

Embodiment 1

After inputting carbon nanotubes of 10 g and distilled water of 990 g into the mixing unit 100, they are stirred while being circulated by the circulating pump 10 to produce the CNT solution. The CNT solution is injected into the pre-heater 200 past the heat exchanger 40 at a flow rate of 13 g/min using the CNT solution high-pressure infusion pump 20 and then pre-heated up to a temperature of 220 to 260° C. Then, the oxygen of gas state compressed at a pressure of 245 to 252 atm is mixed with the CNT solution at a front end of the pre-heater 200 at a flow rate of 0.7 g/min. The CNT liquid mixture is injected into the first purifying-reactor 310 under the sub-critical water condition at a temperature of 280 to 310° C. and a pressure of 230 to 250 atm to cause the oxygen to be reacted with the nano carbon, amorphous carbon and alpha carbon present in the CNT liquid mixture, thereby purifying the CNT firstly. Then, the nitric acid of 2.2 M is injected into the second purifying-reactor 330 using the acid solution high-pressure infusion pump 50 at a flow rate of 13 g/min and then reacted with the first purified CNT liquid mixture purified by the first purifying-reactor 310 to remove the inorganic matters such as metal present within the carbon nanotube, thereby purifying the CNT secondly. The purified CNT is confirmed using a Scanning Electron Microscope SEM and a Transmission Electron Microscope TEM.

COMPARATIVE EXAMPLE 1

The purified product is obtained by processing the CNT with only a first purifying step which is same to the first purifying step of the embodiment 1. The purified CNT is confirmed using a Scanning Electron Microscope SEM and a Transmission Electron Microscope TEM.

Embodiment 2

After undergoing a first purifying step that is same to that of the embodiment 1 except that the temperature of the first purifying-reactor is 340 to 360° C., the nitro methane of 2.2 M is injected into the second purifying-reactor 330 using the acid solution high-pressure infusion pump 50 at a flow rate of 13 g/min and oxidized in accordance with the reaction equation 1 below to cause the CNT solution to be purified firstly by the nitric acid occurring instantly, and then the CNT solution is purified secondly by removing the inorganic matters such as metal present carbon nanotube.

$$NO_2CH_3 + 2O_2 \dashrightarrow HNO_3 + CO_2 + H_2O \quad \text{[Reaction Equation 1]}$$

Test Method
1. Scanning Electron Microscope SEM

It is a S4800 model from Hitachi. We have dispersed the CNT onto water, dropped them on glass plate, and dried them completely, plated them with platinum, and then measured it with SEM.

Figure 4A:
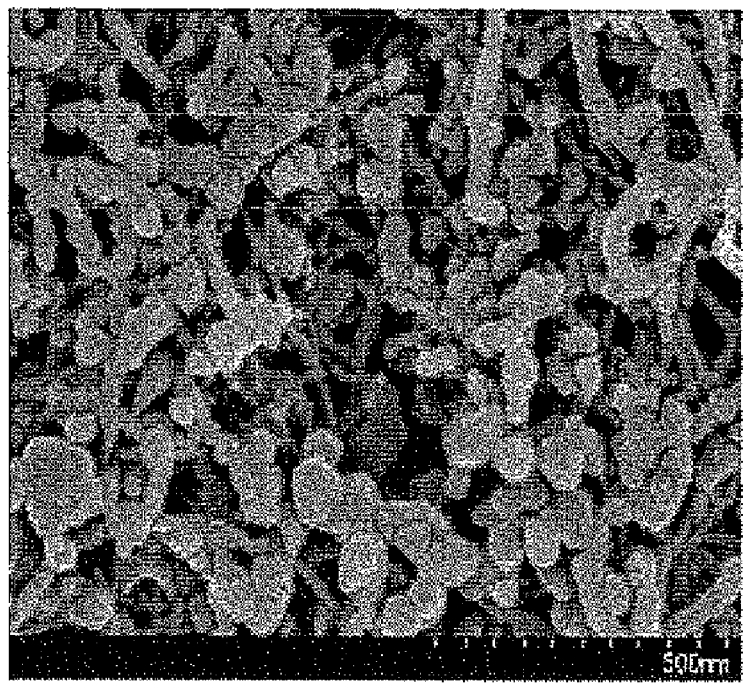
FIGS. 4a and 4b are Scanning Electron Microscope SEM pictures of the carbon nanotubes which are not purified for each magnification according to a comparative example 1.
Figure 4B:
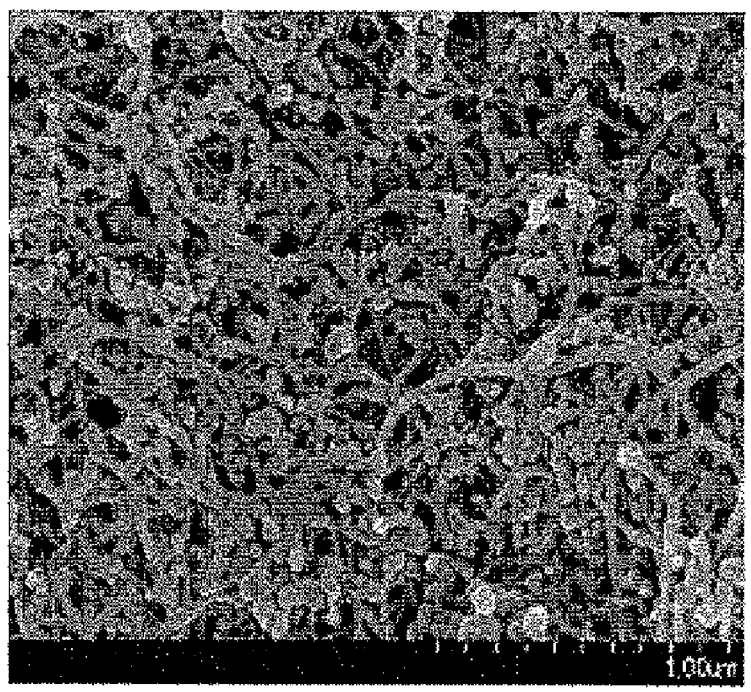

FIGS. 4a and 4b are Scanning Electron Microscope pictures of the carbon nanotube which are not purified according to a comparative example 1, in which FIG. 4a is a hundred thousand-times magnified picture and FIG. 4b is a fifty thousand-times magnified picture.

Figure 5A:
FIGS. 5a and 5b are Scanning Electron Microscope SEM pictures of the carbon nanotubes which are purified for each magnification according to Embodiment 2.
Figure 5B:
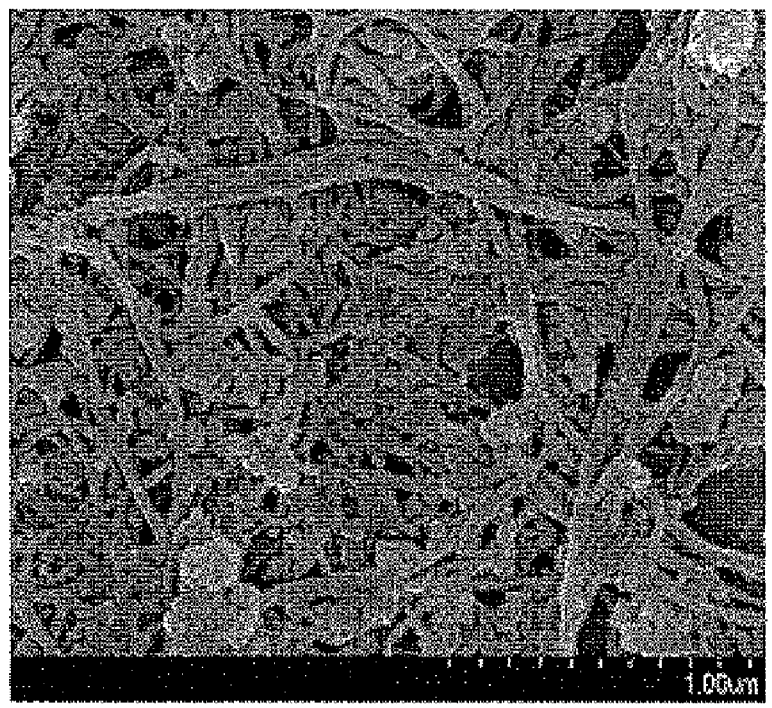

FIGS. 5a and 5b are Scanning Electron Microscope SEM pictures of the first purified carbon nanotube according to the embodiment 2, in which FIG. 5a is a hundred thousand-times magnified picture and FIG. 5b is a fifty thousand-times magnified picture.

Figure 6A:
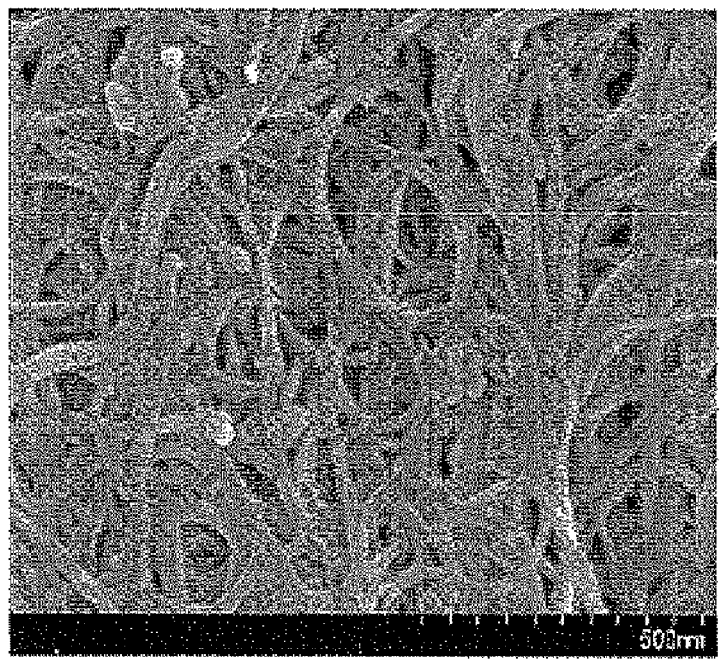
FIGS. 6a and 6b are Scanning Electron Microscope SEM pictures of the carbon nanotubes which are purified for each magnification according to Embodiment 1.
Figure 6B:
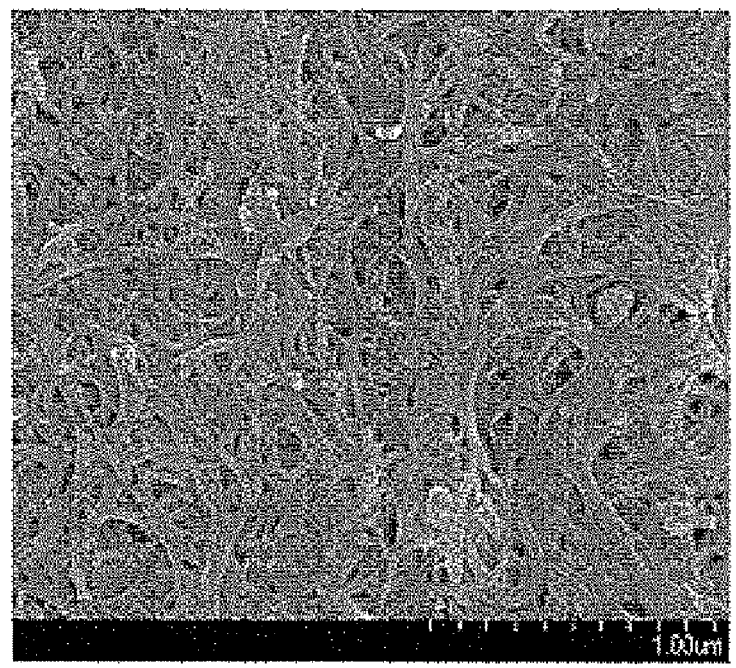

FIGS. 6a and 6b are Scanning Electron Microscope SEM pictures of the carbon nanotubes which are firstly and secondly purified according to the embodiment 1, in which FIG. 6a is a hundred thousand-times magnified picture and FIG. 6b is a fifty thousand-times magnified picture.

As shown from the result of FIGS. 4a, 4b to 6a, 6b, it will be appreciated that the amorphous carbon component is more purified in FIGS. 5a and 5b and the amorphous carbon and the inorganic component are more purified in FIGS. 6a and 6b, as compared with FIGS. 4a and 4b.

2. Transmission Electron Microscope: TEM

It is a JEM-2100F(HR) model from JEOL. We have dispersed the CNT onto water, dropped them onto a grid of holic type, dried them completely, and measured them with TEM.

Figure 7A:
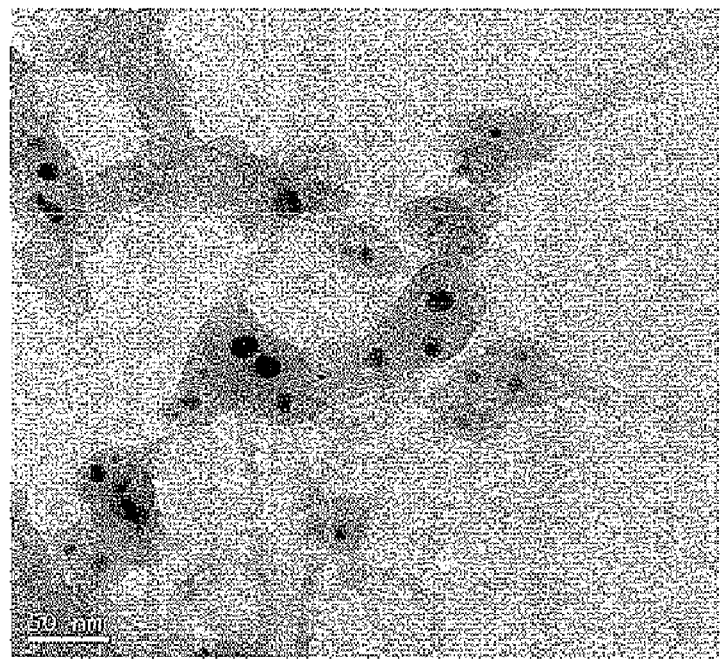
FIGS. 7a and 7b are transmission Electron Microscope TEM pictures of the carbon nanotubes which are not purified for each magnification according to a comparative example 1.
Figure 7B:
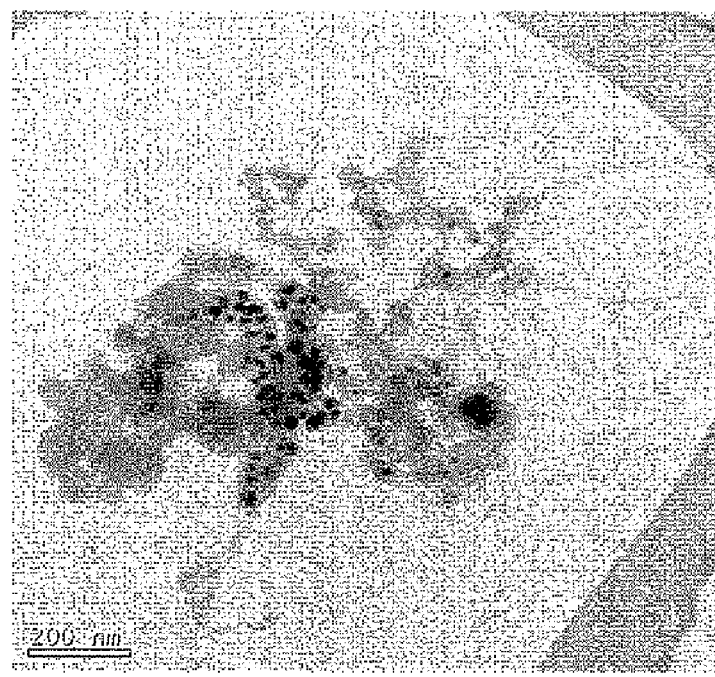

FIGS. 7a and 7b are Transmission Electron Microscope pictures of the carbon nanotube which is not purified according to Comparative example 1, in which FIG. 7a is a hundred thousand times-magnified picture and FIG. 7b is a fifty thousand times-magnified picture.

Figure 8A:
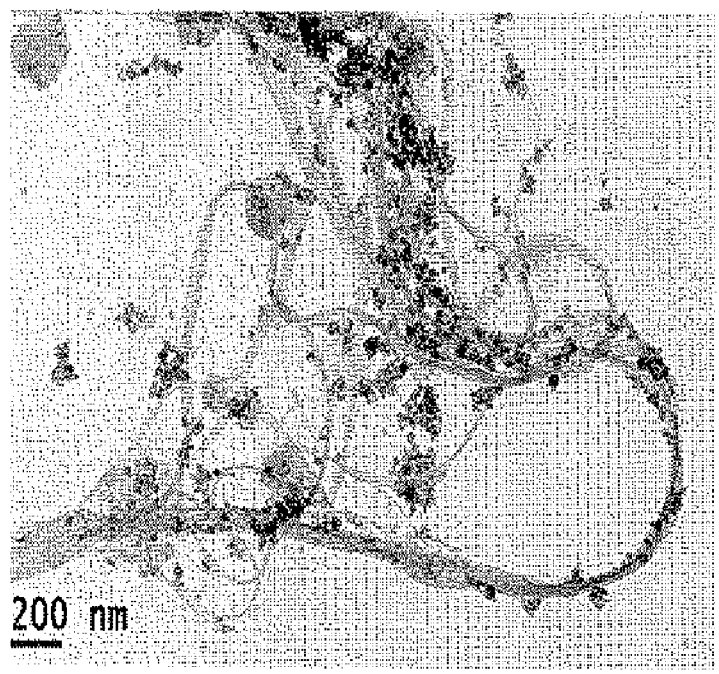
FIGS. 8a and 8b are transmission Electron Microscope TEM pictures of the carbon nanotubes which are purified for each magnification according to Embodiment 2.
Figure 8B:
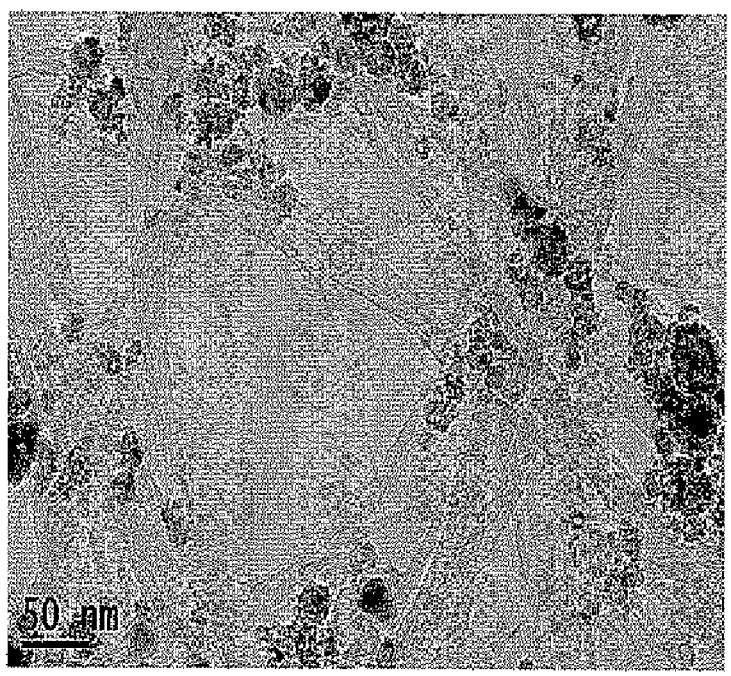

FIGS. 8a and 8b are Transmission Electron Microscope pictures of the carbon nanotube which is firstly purified according to Embodiment 2, in which FIG. 8a is a hundred thousand times-magnified picture view and FIG. 8b is a fifty thousand times-magnified picture view.

Figure 9A:
FIGS. 9a and 9b are transmission Electron Microscope TEM pictures of the carbon nanotubes which are purified for each magnification according to Embodiment 1.
Figure 9B:
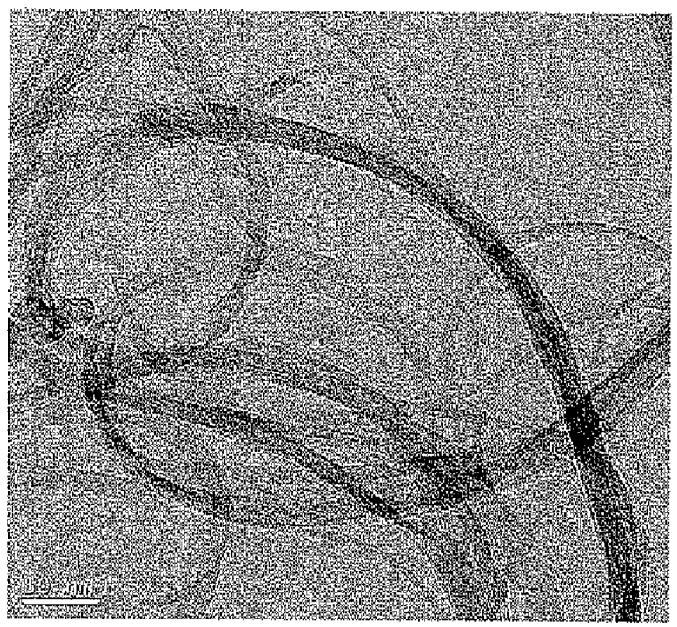

FIGS. 9a and 9b are Transmission Electron Microscope pictures of the carbon nanotube which is firstly and secondly purified according to Embodiment 1, in which FIG. 9a is a hundred thousand times-magnified picture and FIG. 9b is a fifty thousand times-magnified picture.

As shown from the result of FIGS. 7a, 7b to 9a, 9b, it will be appreciated that the amorphous carbon component is more purified in FIGS. 8a and 8b and the amorphous carbon and the inorganic component are more purified in FIGS. 9a and 9b, as compared with FIGS. 7a and 7b.

As described above, the continuous method of purifying carbon nanotubes according to the present invention has an advantage in that the production process can be shortened since it uses the oxidizer which is not harmful under the sub-critical water or supercritical water condition and easy to handle and treat and the carbon nanotube is purified through the continuous apparatus.

Further, the impurities can be eliminated by injecting the oxidizer via continuous sub-critical water or supercritical water process in order to eliminate carbon impurities such as nano carbon, amorphous carbon and alpha carbon contained within the carbon nanotube solution, and the acid solution is injected into the sub-critical water or supercritical water to cause the acid to be easily introduced to the inorganic matters, thereby improving the purification rate.

Further, the carbon nanotube purified according to the present invention can be obtained in a liquid state or a solid state via the continuous apparatus.

While the present invention has been described with respect to the specific embodiments, it will be apparent to those skilled in the art that various changes and modifications may be made without departing from the spirit and scope of the invention as defined in the following claims.

What is claimed is:

1. A continuous method of purifying carbon nanotubes, comprising:
    a) feeding a carbon nanotube solution including carbon nanotube and solvent into a preheater while feeding an oxidizer into the preheater via a heat exchanger to produce a carbon nanotube mixture of the carbon nanotube solution and the oxidizer and then preheating the resultant carbon nanotube mixture at 100 to 370° C.;
    b) feeding the carbon nanotube mixture from the step (a) into a purifying reactor under subcritical water condition of 50 to 400 atm to obtain a purified product;
    c) reacting the purified product from step (b) with an acid solution to remove inorganic material;
    d) cooling down the purified product into 0 to 100° C. and depressurizing the purified product into 1 to 10 atm by feeding the purified product into a cooling down and depressurizing part via the heat exchanger of the step (a) while carrying out the process of step (a); and
    e) recovering the cooled down and depressurized product from the step (d).

2. The continuous method of purifying carbon nanotubes of claim 1, wherein the carbon nanotube is selected from a group consisted of a single-walled, a double walled, a multi-walled, roped and a combination of them.

3. The continuous method of purifying carbon nanotubes of claim 1, wherein the solvent used in the step (a) is selected from a group consisting of water, aliphatic alcohol of $C_1$-$C_{20}$, carbon dioxide and a combination of them.

4. The continuous method of purifying carbon nanotubes of claim 3, wherein the carbon nanotube is contained at 0.0001 to 10 parts by weight per 100 parts of the solvent.

5. The continuous method of purifying carbon nanotubes of claim 1, wherein the carbon nanotube solution further contains a nitro compounds of a chemical equation 1:

$$R-(NO_x)_y \quad \text{[Chemical equation 1]}$$

where R is an alkyl group of $C_1$-$C_7$ or an aryl group of $C_6$-$C_{20}$, and x and y are integers of 1 to 3 independently.

6. The continuous method of purifying carbon nanotubes of claim 5, wherein the nitro compound is contained at 0.00001 to 3 mol/L.

7. The continuous method of purifying carbon nanotubes of claim 1, wherein the oxidizer is selected from a group consisted of oxygen, air, ozone, hydrogen peroxide, nitric acid, nitro compound, nitric acid oxidizer, and a combination of them.

8. The continuous method of purifying carbon nanotubes of claim 1, wherein the oxidizer is contained at 0.001 to 10 equivalent weight in proportion to a carbon equivalent weight of the carbon nanotube within the carbon nanotube liquid mixture.

9. The continuous method of purifying carbon nanotubes of claim 1, wherein the acid solution is an aqueous solution containing any one acid selected from a group consisted of nitric acid, phosphoric acid, sulfuric acid, hydrochloric acid, fluoric acid, and a combination of them.

\* \* \* \* \*